United States Patent [19]

Kawase et al.

[11] Patent Number: 4,839,318

[45] Date of Patent: Jun. 13, 1989

[54] METHOD FOR PRODUCTION OF FINELY POROUS ARTICLE USING SMECTITE MINERAL AS MAIN COMPONENT

[75] Inventors: Kaoru Kawase; Hiroshi Sakami; Shozo Iida, all of Nagoya, Japan

[73] Assignees: Agency of Industrial Science and Technology; Ministry of International Trade and Industry, both of Tokyo, Japan

[21] Appl. No.: 151,980

[22] Filed: Feb. 3, 1988

[30] Foreign Application Priority Data

| Feb. 3, 1987 | [JP] | Japan | 62-22818 |
| Feb. 3, 1987 | [JP] | Japan | 62-22819 |
| Mar. 17, 1987 | [JP] | Japan | 62-62116 |
| Mar. 17, 1987 | [JP] | Japan | 62-62117 |

[51] Int. Cl.$^4$ .......................... B01J 20/12; B01J 20/16
[52] U.S. Cl. ....................................... 502/62; 502/63; 502/84
[58] Field of Search ........................ 502/63, 80, 84, 62

[56] References Cited

U.S. PATENT DOCUMENTS

| 2,967,154 | 1/1961 | Beerman | 502/63 |
| 4,510,257 | 4/1985 | Lewis et al. | 502/63 |
| 4,515,901 | 5/1985 | Elattar | 502/63 |
| 4,629,713 | 12/1986 | Suzuki et al. | 502/63 |
| 4,719,191 | 1/1988 | Battiste et al. | 502/84 |

*Primary Examiner*—Carl F. Dees
*Attorney, Agent, or Firm*—Oblon, Spivak, McClelland, Maier & Neustadt

[57] ABSTRACT

A finely porous article is produced by a method which comprises preparing a colloidal liquid phase containing silica particles by the addition of an ion-exchange resin to an aqueous sodium silicate solution or a liquid phase by the addition of an ion-exchange resin to an aqueous silica colloid solution and the subsequent treatment of the resultant composite for removal of salt or acid therefrom, mixing the former colloidal liquid phase or the latter liquid phase with a smectite type mineral, and drying the resultant mixture.

18 Claims, No Drawings

METHOD FOR PRODUCTION OF FINELY POROUS ARTICLE USING SMECTITE MINERAL AS MAIN COMPONENT

BACKGROUND OF THE INVENTION

1. Field of the Invention

This invention relates to a method for the production of a finely porous article having silica particles inserted between layers of smectite type mineral.

2. Prior Art Statement

Heretofore, as a means for producing a porous material, a method using a smectite type mineral and a metal salt has been attempted.

Examples of the smectite type mineral include montmorillonite, bentonite, chlorite, hectorite, beidellite, and synthetic mica.

They have one common attribute, which will be described below with reference to montmorillonite.

The monotmorillonite has the crystals thereof superposed in a three-sublayer structure of silicic acid tetrahedron-alumina octahedron-silicic acid tetrahedron to form each composite layer.

The surface of each composite layer is negatively charged with part of the alumina of the aforementioned alumina octahedron crystals substituted with magnesium, of small electric charge. The negative charge on the surface of the composite layer is neutralized because an alkali metal ion ($Na^+$) corresponding to the negative charge intervenes between every composite layer.

The montmorillonite, therefore, has a large cation-exchange capacity. The interstices between the respective layers absorb a large volume of water through the reaction of $Na^+$ hydration and swell to separate the component layers to a notable extent. This attribute is inherent also in the other smectite type minerals.

By virtue of this attribute, the smectite type minerals have found utility as raw materials for the production of catalysts, adsorbents, and even porous substances useful as separating agents.

For example, Japanese Patent Disclosures SHO 54(1979)-5884 and SHO 54(1979)-16386 disclose inventions relating to a method for manufacture of a porous clay smectite type mineral containing between the layers of the smectite type mineral a cationic hydroxy metal complex, aluminum chlorohydroxide complex, silicates, phosphates, and zirconia by mixing the smectite type mineral, a cationic inorganic substance, and water, causing the cationic inorganic substance to exchange ions with the exchanging cation between the crystal layers, and hydrolyzing the resultant composite. In this porous clay, the intervals between the crystal layers are not more than 10 Å.

The inventor has been granted U.S. Pat. No. 4,629,713 relating to a method for the production of a porous article containing pores of a larger diameter than those in the porous products of such conventional methods as described above.

This invention concerns a finely porous clay comprising crystal layers of a smectite type mineral separated by intervals of not less than 20 Å and an inorganic substance and optionally a water-soluble polymer embraced between said crystal layers, and a method for the production of said finely porous clay comprising mixing a smectite type mineral, a water-soluble polymer, one member selected from the group consisting of silica colloidal and water glass, at least one cation, and water and subsequently removing the water-soluble polymer from the resultant mixture. In this invention, water-soluble polymers usable are limited to starch, konjak, agar, grated yam, gum arabic, glue, gelatin, polyethylene oxide, polyvinyl alcohol, polyacrylic acid derivatives, polyvinyl sulfonic acid derivatives, and carboxycellulose derivatives.

In the method of production described above, the silica colloidal intervenes between the crystal layers of smectite mineral and the water-soluble polymer plays the part of increasing the interfacial intervals between the layers.

However, the invention of the aforementioned U.S. Patent has the following disadvantage because the water-soluble polymer is limited as described above. The surface of the smectite mineral and that of the inorganic substance are equally charged negatively and, therefore, repel each other, while the positive charge at the edge of the smectite mineral and the negative charge of the inorganic substance attract each other. Thus, the inorganic substances are present not merely in the interfacial intervals but also around the particles formed by the layer stacks. Thus, the produced porous clay possesses a complicated structure. Because of its structural complexity, the porous clay inevitably contains micropores of diameters distributed over a wide range. It is therefore not suited for use as a separating material for separation of molecules of a specific diameter or as a catalyst for the production of specific molecules.

The porous article produced by this method, on being burnt, produces carbon because the polymer is present between the layers. The presence of this carbon is detrimental when the porous article is used as a catalyst, for example. The present inventors have perfected a method which is free from the disadvantage of the invention of the aforementioned U.S. patent and has filed for a U.S. patent on this improvement (U.S. Application Ser. No. 06/940,087). This improvement consists in using, in place of the water-soluble polymer essential to the aforementioned U.S. patent, a mixture of (1) molecular quaternary ammonium salt having a quaternary amine linked to a water-soluble macromolecular compound and possessing basicity, (2) a polymer of a polyoxyethylene alkylvinyl monomer and a vinyl monomer possessing basicity, or (3) a polymer of a halogenide of a quaternary amine, i.e. a basic macromolecular compound, and at least one water-soluble macromolecular substance selected from the group consisting of cellulose, polyvinyl alcohol, polyethylene oxide, and polyacrylamide.

The substances described above, however, are invariably expensive and the methods used therefor are complicated in terms of procedure. Thus, they entail problems in practical application to volume production of porous articles.

OBJECT AND SUMMARY OF THE INVENTION

In the circumstances, the development of a method capable of economically producing a porous article by a simple procedure using only silica and a smectite type mineral has been desired.

This invention aims to satisfy this desire.

As a result of various studies, the inventors have found that the object described above is accomplished by a method which comprises pretreating a $SiO_2$ with a specific means and inserting said treated $SiO_2$ material between the layers of smectite type mineral crystals so as to separate the layers by a proper distance.

Specifically, this invention is directed to a method for the production of a finely porous article, characterized by preparing as a liquid phase $SiO_2$ material either (1) a colloidal liquid phase containing silica particles obtained by the addition of an ion-exchange resin, preferably a strongly acidic ion-exchange resin, to an aqueous sodium silicate solution or (2) a liquid phase obtained by the addition of an ion-exchange resin to an aqueous silica colloid solution and the subsequent removal of salt or acid from the aforementioned aqueous solution, mixing the liquid phase with a smectite type mineral, and drying the resultant mixed liquid phase.

DETAILED DESCRIPTION OF THE PREFERRED EMBODIMENTS

The smectite type mineral for use in the present invention is one member selected from the group consisting of montmorillonite, bentonite, chlorite, beidellite, hectorite, synthetic mica and various mixtures of two or more of the members mentioned above.

The silica source to be mixed with the smectite type mineral is silica colloid. This silica colloid is required to have undergone either of the following treatments.

(1) Method using aqueous sodium silicate solution

Generally, in this case, a silica colloid containing fine silica-particles resulting from polymerization of silicic acid is formed by removing salt with a strongly acidic ion-exchange resin and, when necessary, further removing acid with a basic ion-exchange resin. This silica colloid is mixed with the smectite type mineral. The silica particles in the colloid have diameters in the range of 4 to 50 nm. The silica colloid solution has a pH value in the range of 1 to 7.

(2) Method directly using silica colloid

The silica colloid solution which has silica dispersed therein generally incorporates therein an alkali or an acid in an amount equivalent to the negative charge of silica colloid so that the silica colloid solution may retain the colloidal state thereof stably.

When the silica colloid directly used in the method of this invention is in an alkaline state, it is adjusted to a pH value approximately in the range of 1 to 7 by removal of salt with a strongly acidic ion-exchange resin. Conversely when the silica colloid is in an acidic state, it is adjusted to a pH value approximately in the range of 7 to 9 by removal of acid with a strongly basic ion-exchange resin. Optionally the former silica colloid may be adjusted with a weakly basic ion-exchange resin and the latter silica colloid with a weakly acidic ion-exchange resin, respectively, to a pH value approximately in the range of 4 to 7.

In either of the cases mentioned above, the silica particles in the produced liquid phase have the greater part of their surface formed with a silanol group and, therefore, are in a state possessing a decreased surface charge. The silica colloid particles which are in such a state as having a notably decreased surface charge are liable to couple with one another. To preclude this undesirable phenomenon, the liquid phase must be stored in a cold place.

When the silica colloid solution is added to the smectite type mineral, the smectite type mineral may be in the form of powder or in the state swelled with water. When the smectite type mineral and the colloid solution added thereto are thoroughly stirred, the silica particles are introduced into the interstices between the layers of smectite type mineral crystals.

In this case, part of the smectite is converted into a hydrogen smectite mineral by the action of the $H^+$ present in the silica colloid solution and consequently caused to block out the site of the reaction between the layers. Since the silica particles have already been introduced into the interstices between the layers, they persist and serve to bridge the adjacent layers. By the method of this invention which gives rise to bridges between the layers of the smectite type mineral in the manner described above, there is produced a finely porous article, i.e. a composite having superposed at random a multiplicity of layers of the mineral bridged with each other by the silica particles.

The layers of the smectite type mineral are allowed to increase their overall thickness as their interstices are swelled with water. The amount of water required for the purpose of this swelling is not less than 0.4 ml per g of the mineral. Practically the upper limit of the amount of water is 30 ml.

The proportion of the amount of the silica particles to that of the smectite type mineral is desired to fall in the range of 0.001 to 50% by weight. If the ratio is less than the lower limit of the range mentioned above, the product fails to acquire a porous texture throughout the entire volume because the inorganic particles are not fully distributed between the layers of the smectite type mineral crystals. If this ratio exceeds the upper limit of the range, the product fails to acquire a porous texture because the silica particles completely bury the interstices between the layers of the smectite type mineral.

The liquid phase resulting from the mixture of the silica particles with the smectite type mineral is dried at a temperature in the range of 30° to 110° C. to produce a finely porous article. To obtain this finely porous article in a strongly bound state, the dried article is further fired at a temperature in the range of 300° to 600° C.

As a result, there is obtained a finely porous article which is an aggregate of layers of smectite type mineral and silica particles strongly bound to one another and interposed between the aforementioned layers.

Since the method of this invention gives a special treatment to the silica material before the silica material is mixed with the smectite type mineral, it has no need for the additional incorporation of a polymer which is indispensable to the conventional method in obtaining a finely porous article in which layers of the smectite type mineral are stably retained. The aforementioned special treatment consists in mixing the silica material and the ion-exchange resin in a liquid state. It is easy and economical to perform and is practicable.

The silica particles (silica colloid) to be produced in the course of the method of this invention are desired to have diameters in the range of 1 to 15 nm, preferably 4 to 15 nm.

A specific additive incorporated in the raw material in advance contributes to enhancing the stability of the porous article to be produced.

Examples of the special additive useful for this purpose include the following organic compounds and metallic compounds.

In the case of an organic compound, it is desired to be soluble in water and, on being dissolved in water, exhibit basicity. Primary, secondary, and tertiary amines and quaternary amino salts of lower aliphatic compounds answer the description. Concrete examples of the compounds are methyl amine, ethyl amine, n-propyl amine, iso-propyl amine, n-butyl amine, sec-butyl amine, isobutyl amine, tert-butyl amine, dimethyl amine, diethyl amine, di-n-propyl amine, di-iso-propyl amine, di-n-butyl amine, di-sec-butyl amine, trimethyl amine, triethyl amine, choline chloride, and acetylcholine chloride. These organic compounds may be used either independently of each other or in the form of various mixtures of two or more members. In all the organic compounds cited above, choline chloride and acetylcholine chloride prove to be particularly desirable.

In the case of a metal compound, it is desired to be in the form of a metal salt or a metal acid salt. Concrete examples of the metal salt include chlorides, nitrates, sulfates, carbonates, borates, phosphates, silicates, and acetates of such metals as sodium, potassium, magnesium, aluminum, calcium, zinc, chromium, manganese, iron, cobalt, nickel, copper, molybdenum, zirconium, titanium, and tin. Concrete examples of the metal acid salt include sodium and potassium aluminates, sodium and potassium cobaltinitrites, sodium and potassium vanadates, sodium and potassium selenates, and sodium and potassium manganates. These metal compounds may be used either independently of each other or in the form of various mixtures of two or more members. Among the metal compounds enumerated above, aluminum chloride and oxyzirconium chloride prove to be particularly desirable.

The amount of the organic compound or the metal compound mentioned above to be used effectively herein is required to fall in the range of 0.0001 to 10% by weight based on the amount of the silica particles. If this amount exceeds the upper limit of the range mentioned above, the compound reacts with the smectite type mineral to cause narrowing of the interstices between the layers of the smectite type mineral. If this amount fails to reach the lower limit of the range, the incorporation of the additive compound does not bring about any recognizable effect.

The porous article which is produced by the method of this invention, on analysis by wide-angle X-ray diffraction, is found to have layers spaced with an interval in the range of 1 to 15 nm and contain fine pores whose diameters are never less than 1 nm and are mostly not less than 4 nm. By the adsorption method using nitrogen, the porous article is found to possess a total specific surface area approximately in the range of 200 to 500 $m^2/g$ and a nitrogen volume approximately in the range of 0.1 to 0.36 ml/g.

Since the method of the present invention uses silica particles which have undergone a special treatment, it is capable of producing a porous article having the silica articles bound strongly with a smectite type mineral as aimed at without specifically requiring incorporation of a polymer, an indispensable additive for the conventional method. A porous article containing fine pores whose diameters are variable with the size of the silica particles to be used can be produced inexpensively and easily, therefore, by the method of the present invention.

The finely porous article cal treatment, inexpensively and relatively simply and, therefore, is useful as a separating agent for liquids and gases, an adsorbent, and a catalyst carrier.

Now, the present invention will be described more specifically below with reference to working examples.

EXAMPLE 1

One hundred (100) ml of an aqueous 3.2% silica colloid solution (produced by Shokubai Kasei K.K. and marketed as product "No. SI-500") and 9.5 g of a strongly acidic ion-exchange resin (produced by Dowex Co., and marketed as product "No. 50 WX12") added thereto were stirred to effect removal of salt. After the removal of salt, the solution showed a pH value of 3.3. This solution was further deacidified with a weakly basic ion-exchange resin. The solution resulting from the deacidification showed a pH value of 4.8.

In 10 ml of the silica colloid solution consequently obtained, 2 g of montmorillonite powder was stirred for mixture. The resultant mixture was left standing in a drier at 52° C. for 16 hours to be dried. On analysis by wide-angle X-ray diffraction, the dried product was found to have layers of crystals spaced at an interval of 4.1 nm. By the nitrogen adsorption method, it was found to possess an average pore diameter of 4.4 nm, a specific surface area of 280 $m^2/g$ in pores of a diameter of 2 nm, a nitrogen volume of 0.28 ml/g, a specific volume of 0.44 $cm^3/g$, and a poroxity of 0.64. The physical constants mentioned above are shown in a Table attached.

EXAMPLE 2

In 20 ml of a silica colloid solution prepared in Example 1, 2 g of montmorillonite was stirred for mixture. The resultant mixture was left standing in a drier at 52° C. for 16 hours to be dried. The physical constants of the product were as shown in the Table.

EXAMPLE 3

In 50 ml of the silica colloid solution prepared in Example 1, 2 g of montmorillonite was stirred for mixture. The resultant mixture was left standing in a drier at 52° C. for 16 hours to be dried. The physical constants of the dried product are shown in the Table.

EXAMPLE 4

In 5 ml of the silica colloid solution prepared in Example 1, 2 g of montmorillonite was stirred for mixture. The resultant mixture was left standing in a drier at 52° C. for 16 hours to be dried. The physical constants of the dried product are shown in the Table.

EXAMPLE 5

One hundred (100) ml of an aqueous 3.2% silica colloid solution (produced by Shokubai Kasei K.K. and marketed as product "No. SI-350") and 2.0 g of a strongly acidic ion-exchange resin (produced by Dowex Co., and marketed as product "No. 50 WX12") added thereto were stirred to effect removal of salt. The solution resulting from the salt removal showed a pH value of 2.6. This solution was further deacidified with a weakly basic ionexchange resin. The deacidified solution showed a pH value of 4.2.

Ten (10) ml of the silica colloid solution consequently obtained and 2 g of montmorillonite powder added thereto were stirred for mixture. The resultant mixture was left standing in a drier at 50° C. for 16 hours to be dried. The physical constants of the product are shown in the Table.

EXAMPLE 6

One hundred (100) ml of an aqueous 3.2% silica colloid solution (produced by Shokubai Kasei K.K. and marketed as product "No. SI-500") and 9.5 g of strongly acidic ion-exchange resin (produced by Dowex Co., and marketed as product "No. 50 WX12") were stirred to effect removal of salt. The solution resulting from the salt removal showed a pH value of 3.3 This solution was further deacidified with a weakly basic ion-exchange resin. The deacidified solution showed a pH value of 4.8.

Ten (10) ml of the silica colloid solution and 2 g of synthetic mica powder (produced by Topy Industry, Ltd. and marketed as "NaTS") added thereto were stirred for mixture. The resultant mixture was left standing in a drier at 50° C. for 16 hours to be dried. The physical constants of the product are shown in the Table.

EXAMPLE 7

One hundred (100) ml of an aqueous 3.0% sodium silicate solution and 2.1 g of a strongly acidic ion-exchange resin (produced by Dowex Co., and marketed as product "No. 50 WX12") added thereto were stirred to effect removal of salt. The solution resulting from the salt removal showed a pH value of 2.6. This solution was further deacidified with a weakly basic ion-exchange resin. The deacidified solution showed a pH value of 4.2.

Ten (10) ml of the silica colloid solution consequently obtained and 2 g of montmorillonite added thereto were stirred for mixture. The resultant mixture was left standing in a drier at 52° C. for 18 hours to be dried. The physical constants of the product are shown in the Table.

EXAMPLE 8

Twenty (20) ml of the silica colloid solution prepared in Example 7 and 2 g of montmorillonite added thereto were stirred. The resultant mixture was left standing in a drier at 52° C. for 16 hours to be dried. The physical constants of the product are shown in the Table.

EXAMPLE 9

Five (5) ml of the silica colloid solution prepared in Example 7 and 2 g of montmorillonite added thereto were stirred. The resultant mixture was left standing in a drier at 52° C. for 16 hours to be dried. The physical constants of the product are shown in the Table.

EXAMPLE 10

Fifty (50) ml of the silica colloid solution prepared in Example 7 and 10 g of montmorillonite added thereto were stirred. The resultant mixture was left standing in a drier at 105° C. for 16 hours to be dried. The physical constants of the product are shown in the Table.

EXAMPLE 11

One hundred (100) ml of an aqueous 3.0% sodium silicate solution and 2.0 g of a strongly acidic ion-exchange resin (produced by Dowex Co., and marketed as product "No. 50 WX12") added thereto were stirred to effect removal of salt. The solution resulting from the salt removal showed a pH value of 3.3. This solution was further deacidified with a weakly basic ion-exchange resin. The deacidified solution showed a pH value of 5.6.

Ten (10) ml of the silica colloid solution and 2 g of montmorillonite powder added thereto were stirred. The resultant mixture was left standing in a drier at 50° C. for 16 hours to be dried. The physical constants of the product are shown in the Table.

EXAMPLE 12

One hundred (100) ml of an aqueous 3.0% sodium silicate solution and 2.0 g of a strongly acidic ion-exchange resin (produced by Dowex Co., and marketed as product "No. 50 WX12") added thereto were stirred to effect removal of salt. The solution resulting from the salt removal showed a pH value of 2.5.

Ten (10) ml of the silica colloid solution and 2 g of synthetic mica powder (produced by Topy Industry, Ltd. and marketed as "NaTS") added thereto were stirred. The resultant mixture was left standing in a drier at 50° C. for 16 hours to be dried. The physical constants of the product are shown in the Table.

EXAMPLE 13

One hundred (100) ml of an aqueous 3.0% sodium silicate solution and 2.1 g of a strongly acidic ion-exchange resin (produced by Dowex Co., and marketed as product "No. 50 WX12") added thereto were stirred to effect removal of salt. The solution resulting from the salt removal showed a pH value of 2.6. This solution was further deacidified with a weakly basic ion-exchange resin to produce a silica colloid dispersion having a pH value of 4.2. Then, this silica colloid dispersion and choline chloride added thereto in a proportion of 0.02 g per g of silica colloid were stirred for mixture. The silica colloid particles in the resultant solution were positively charged, with choline bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 14

The silica colloid dispersion prepared in Example 13 and having a pH value of 4.2 and acetyl choline chloride added thereto in a proportion of 0.005 g per g of silica colloid were stirred. The silica colloid particles in the resultant solution were positively charged, with acetyl choline bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 15

The silica colloid dispersion prepared in Example 13 and having a pH value of 4.2 and trimethyl amine hydrochloride added thereto at the rate of 0.003 g per g of silica colloid were stirred. The silica colloid particles in the resultant solution were positively charged, with trimethyl amine bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 16

The silica colloid dispersion prepared in Example 13 and having a pH value of 4.2 and triethyl amine hydrochloride added thereto at the rate of 0.005 g per g of silica colloid were stirred. The silica colloid particles in the resultant solution were positively charged, with triethyl amine bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 17

One hundred (100) ml of an aqueous 3.0% sodium silicate solution and 5.1 g of a strongly acidic ion-exchange resin (produced by Dowex Co., and marketed as product "No. 50 WX12") added thereto were stirred to effect removal of salt. The solution resulting from the salt removal showed a pH value of 2.5. This solution was further deacidified with a weakly basic ion-exchange resin to produce a silica colloid dispersion having a pH value of 3.8. Then, this silica colloid dispersion and choline chloride added thereto at the rate of 0.003 g per g of silica colloid were stirred. The silica colloid particles in the resultant solution were positively charged, with choline bound to part of the surface thereof.

Ten (10) ml of the silicon colloid dispersion and 2 g of synthetic mica powder (produced by Topy Industry, Ltd. and marketed as "NaTS") added thereto were stirred. The resultant mixture was left standing in a drier at 50° C. for 16 hours to be dried. The physical constants of the product are shown in the Table.

EXAMPLE 18

One hundred (100) ml of an aqueous 3.2% silica colloid dispersion (produced by Shokubai Kasei K.K. and marketed as product "No. SI-500") and 9.2 g of a strongly acidic ion-exchange resin (produced by Dowex Co., and marketed as product "No. 50 WX12") added thereto were stirred to effect removal of salt. The solution resulting from the salt removal showed a pH value of 3.3. This solution was further deacidified with a weakly basic ion-exchange resin to produce a silica colloid dispersion having a pH value of 4.8. The silica colloid dispersion and choline chloride added thereto at the rate of 0.005 g per g of silica colloid were stirred. The silica colloid particles in the resultant solution were positively charged, with choline bound to part of the surface thereof.

Ten (10) ml of this silica colloid dispersion and 2 g of montmorillonite powder added thereto were stirred. The resultant mixture was left standing in a drier a 50° C. for 16 hours to be dried. The physical constants of the product are shown in the Table.

EXAMPLE 19

The silica colloid dispersion prepared in Example 18 and having a pH value of 4.8 and acetyl choline chloride added thereto at the rate of 0.005 g per g of silica colloid were stirred. The silica colloid particles in the resultant solution were positively charged, with acetyl choline bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 20

The silica colloid dispersion prepared in Example 18 and having a pH value of 4.8 and trimethyl amine hydrochloride added thereto at the rate of 0.004 g per g of silica colloid were stirred. The silica colloid particles in the resultant solution were positively charged, with trimethyl amine bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 21

The silica colloid dispersion prepared in Example 18 and having a pH value of 4.8 and triethyl amine hydrochloride added thereto at the rate of 0.05 g per g of silica colloid were stirred. The silica colloid particles in the resultant solution were positively charged, with triethyl amine bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 22

The silica colloid dispersion prepared in Example 18 and having a pH value of 4.8 and acryl trimethyl amine chloride added thereto at the rate of 0.01 g per g of silica colloid were stirred. The silica colloid particles in the resultant solution were positively charged, with acryl trimethyl amine bound to part of the surface thereof.

Ten (10) ml of the silica colloid dispersion and 2 g of montmorillonite powder added thereto were stirred. The resultant mixture was left standing in a drier at 105° C. for 16 hours to be dried. The physical constants of the product are shown in the Table.

EXAMPLE 23

One hundred (100) ml of an aqueous 3.2% silica colloid dispertion (produced by Shokubai Kasei K.K. and marketed as product "No. SI-500") and 9.5 g of a strongly acidic ion-exchange resin (produced by Dowex Co., and marketed as product "No. 50 WX12") added thereto were stirred to effect removal of salt. The solution resulting from the salt removal showed a pH value of 3.3. This solution was further deacidified with a weakly basic ion-exchange resin to produce a silica colloid dispersion having a pH value of 4.8. Then, the silica colloid dispersion and choline chloride added thereto at the rate of 0.002 g per g of silica colloid were stirred. The silica colloid particles in the resultant solution were positively charged, with choline bound to part of the surface thereof.

Ten (10) ml of the silica colloid dispersion and 2 g of synthetic mica powder (produced by Topy Industry, Ltd. and marketed as "NaTS") added thereto were stirred. The resultant mixture was left standing in a drier at 50° C. for 16 hours to be dried. The physical constants of the product are shown in the Table.

EXAMPLE 24

Fifty (50) ml of an aqueous 3.0% (weight) sodium silicate solution and 5.1 g of a strongly acidic ion-exchange resin (produced by Dowex Co., and marketed as product "No. 50 WX12") added thereto were stirred to effect removal of salt. The solution resulting from the salt removal showed a pH value of 2.5. This solution was further deacidified with a weakly basic ion-exchange resin to produce a silica colloid dispersion having a pH value of 3.8. Then, this silica colloid dispersion and sodium aluminate added thereto at the rate of 0.001 g per g of silica colloid were stirred. The silica colloid particles in the solution were positively charged, with alumina bound to part of the surface thereof.

Ten (10) ml of this silica colloid dispersion and 2 g of montmorillonite powder added thereto were stirred. The resultant mixture was left standing in a drier at 50° C. for 16 hours to be dried. The physical constants of the product are shown in the Table.

EXAMPLE 25

The silica colloid dispersion prepared in Example 24 and having a pH value of 3.8 and oxyzirconium chloride added thereto at the rate of 0.01 g per g of silica colloid were stirred. The silica colloid particles in the solution were positively charged with oxyzirconium bound to part of the surface thereof.

Ten (10) ml of the silica colloid dispersion and 2 g of montmorillonite powder added thereto were stirred. The resultant mixture was left standing in a drier at 150° C. for 8 hours to be dried. The physical constants of the product are shown in the Table.

EXAMPLE 26

The silica colloid dispersion prepared in Example 24 and having a pH value of 3.8 and titanium chloride added thereto at the rate of 0.005 g per g of silica colloid were stirred. The silica colloid particles were positively charged, with titanium bound to part of the surface thereof.

Ten (10) ml of this silica colloid dispersion and 2 g of montmorillonite powder added thereto were stirred. The resultant mixture was left standing in a drier at 105° C. for 8 hours to be dried. The physical constants of the product are shown in the Table.

EXAMPLE 27

The silica colloid dispersion prepared in Example 24 and having a pH value of 3.8 and cobalt chloride added thereto at the rate of 0.02 g per g of silica colloid were stirred. The silica colloid particles in the resultant solution were positively charged, with cobalt bound to part of the surface thereof.

Ten (10) ml of this silica colloid dispersion and 2 g of montmorillonite powder added thereto were stirred. The resultant mixture was left standing in a drier at 50° C. for 16 hours to be dried. The physical constants of the product are shown in the Table.

EXAMPLE 28

One hundred (100) ml of an aqueous 3.0% (by weight) sodium silicate solution and 5.1 g of a strongly acidic ion-exchange resin (produced by Dowex Co., and marketed as product "No. 50 WX12") added thereto were stirred to effect removal of salt. The solution resulting from the salt removal showed a pH value of 2.5. This solution was further deacidified with a weakly basic ion-exchange resin to produce a silica colloid dispersion having a pH value of 3.8. Then, the silica colloid dispersion and sodium aluminate added thereto at the rate of 0.003 g per g of silica colloid were stirred. The silica colloid particles in the resultant solution were positively charged, with aluminum bound to part of the surface thereof.

Ten (10) ml of the silica colloid dispersion and 2 g of synthetic mica powder (produced by Topy Industry, Ltd. and marketed as "NaTS") added thereto were stirred. The resultant mixture was left standing in a drier at 50° C. for 16 hours to be dried. The physical constants of the product are shown in the Table.

EXAMPLE 29

One hundred (100) ml of an aqueous 3.2% (by weight) silica colloid dispersion (produced by Shokubai Kasei K.K. and marketed as product "No. SI-500") and 9.5 g of a strongly acidic ion-exchange resin (produced by Dowex Co., and marketed as product "No. 50 WX12") added thereto were stirred to effect removal of salt. The solution resulting from the salt removal showed a pH value of 3.3. This solution was further deacidified with a weakly basic ion-exchange resin to produce a silica colloid dispersion having a pH value of 4.8. Then, this silica colloid dispersion and sodium aluminate added thereto at the rate of 0.002 g per g of silica colloid were stirred. The silica colloid particles in the resultant solution were positively charged, with aluminum bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 30

The silica colloid dispersion prepared in Example 29 and having a pH value of 4.8 and oxyzirconium chloride added thereto at the rate of 0.002 g per g of silica colloid were stirred. The silica colloid particles in the solution were positively charged, with oxyzirconium bound to part of the surface thereof.

Ten (10) ml of this silica colloid dispersion and 2 g of montmorillonite powder added thereto were stirred. The resultant mixture was left standing in a drier at 50° C. for 16 hours to be dried. The physical constants of the product are shown in the Table.

EXAMPLE 31

The silica colloid dispersion prepared in Example 29 and having a pH value of 4.8 and aluminum chloride added thereto at the rate of 0.002 g per g of silica colloid were stirred. The silica colloid particles in the solution were positively charged, with aluminum bound to part of the surface thereof.

Ten (10) ml of this silica colloid dispersion and 2 g of montmorillonite powder added thereto were stirred. The resultant mixture was left standing in a drier at 50° C. for 16 hours to be dried. The physical constants of the product are shown in the Table.

EXAMPLE 32

The silica colloid dispersion prepared in Example 29 and having a pH value of 4.8 and cobalt chloride added thereto at the rate of 0.03 g per g of silica colloid were stirred. The silica colloid particles in the resultant solution were positively charged, with cobalt bound to part of the surface thereof.

Ten (10) ml of the silica colloid dispersion and 2 g of montmorillonite powder added thereof were stirred. The resultant mixture was left standing in a drier at 50°

C. for 16 hours to be dried. The physical constants of the product are shown in the Table.

EXAMPLE 33

The silica colloid dispersion prepared in Example 29 and having a pH value of 4.8 and titanium chloride added thereto at the rate of 0.01 g per g of silica colloid were stirred. The silica colloid particles in the resultant solution were positively charged, with titanium bound to part of the surface thereof.

Ten (10) ml of the silica colloid dispersion and 2 g of montmorillonite powder added thereto were stirred. The resultant mixture was left standing in a drier at 50° C. for 16 hours to be dried. The physical constants of the product are shown in the Table.

EXAMPLE 34

One hundred (100) ml of an aqueous 3.2% (by weight) silica colloid dispersion (produced by Shokubai Kasei K.K. and marketed as product "No. SI-500") and 9.5 g of a strongly acidic ion-exchange resin (produced by Dowex Co., and marketed as product "No. 50 WX12") added thereto were stirred to effect removal of salt. The solution resulting from the salt removal showed a pH value of 3.3. This solution was further deacidified with a weakly basic ion-exchange resin to produce a silica colloid dispersion having a pH value of 4.8. Then, the silica colloid dispersion and sodium aluminate added thereto at the rate of 0.02 g per g of silica colloid were stirred. The silica colloid particles in the solution were positively charged, with aluminum bound to part of the surface thereof.

Ten (10) ml of the silica colloid dispersion and 2 g of synthetic mica powder (produced by Topy Industry, Ltd. and marketed as "NaTS") added thereto were stirred. The resultant mixture was left standing in a drier at 50° C. for 16 hours to be dried. The physical constants of the product are shown in the Table.

ing said colloidal liquid phase with a smectite type mineral, then drying the resultant mixture.

2. The method according to claim 1, wherein said smectite type mineral is at least one member selected from the group consisting of montmorillonite, bentonite, beidellite, hectrite, and synthetic mica.

3. The method according to claim 1, wherein the amount of water in said mixture of colloidal liquid phase with smectite type mineral is in the range of 0.4 to 30 ml per g of said mineral.

4. The method according to claim 1, wherein the amount of said silica particles in said colloidal liquid phase is in the range of 0.001 to 50% by weight, based on said smectite type mineral.

5. The method according to claim 1, wherein said mixture is obtained by adding at least one member selected from the group consisting of organic compounds selected from the consisting of primary amines, secondary amines, tertiary amines and quaternary amines of lower aliphatic hydrocarbons and at least one metal compound selected from the group consisting of sodium aluminate, oxyzirconium chloride, titanium chloride, cobalt chloride and aluminum chloride in an amount in the range of 0.0001 to 10% by weight, based on silica particles, to said colloidal liquid phase and said smectite type minereal.

6. A method for the production of a finely porous article, characterized by adding an ion-exchange resin to an aqueous silica colloid solution to effect removal of salt or acid from said aqueous solution, mixing the resultant liquid phase with a smectite type mineral, and drying the resultant mixture.

7. The method according to claim 6, wherein said smectite type mineral is at least one member selected from the group consisting of montmorillonite, bentonite. beidellite, hectorite, and synthetic mica.

8. The method according to claim 6, wherein the amount of water in said mixture is in the range of 0.4 to

TABLE

| Example No. | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| Distance between layers (nm) | 4.1 | 4.1 | 4.1 | 4.1 | 6.3 | 4.4 | 4.4 | 4.2 | 4.2 | 4.2 | 3.7 | 4.0 | 4.4 | 4.2 | 3.8 | 4.0 | 4.3 |
| Specific surface area ($m^2/g$) | 280 | 300 | 330 | 270 | 320 | 305 | 380 | 440 | 410 | 382 | 400 | 380 | 180 | 220 | 192 | 180 | 222 |
| Average pore diameter (nm) | 4.4 | 4.4 | 4.4 | 4.4 | 7.2 | 3.8 | 4.4 | 4.4 | 4.4 | 4.4 | 4.0 | 4.4 | 4.8 | 4.4 | 4.0 | 4.2 | 4.0 |
| Nitrogen volume (ml/g) | 0.28 | 0.30 | 0.32 | 0.28 | 0.36 | 0.29 | 0.24 | 0.29 | 0.28 | 0.28 | 0.36 | 0.35 | 0.36 | 0.31 | 0.35 | 0.28 | 0.33 |
| Specific volume ($m^3/g$) | 0.44 | 0.45 | 0.48 | 0.42 | 0.51 | 0.48 | 0.45 | 0.48 | 0.45 | 0.48 | 0.46 | 0.48 | 0.48 | 0.46 | 0.51 | 0.42 | 0.48 |
| Porosity | 0.64 | 0.67 | 0.67 | 0.67 | 0.71 | 0.60 | 0.53 | 0.60 | 0.62 | 0.58 | 0.78 | 0.73 | 0.75 | 0.67 | 0.69 | 0.67 | 0.69 |
| Example No. | 18 | 19 | 20 | 21 | 22 | 23 | 24 | 25 | 26 | 27 | 28 | 29 | 30 | 31 | 32 | 33 | 34 |
| Distance between layers (nm) | 3.8 | 4.0 | 3.9 | 4.1 | 4.8 | 4.3 | 3.8 | 3.7 | 3.5 | 4.1 | 4.3 | 3.8 | 4.0 | 4.1 | 4.4 | 4.0 | 4.4 |
| Specific surface area ($m^2/g$) | 220 | 200 | 232 | 382 | 200 | 170 | 220 | 205 | 180 | 195 | 202 | 250 | 180 | 220 | 275 | 380 | 220 |
| Average pore diameter (nm) | 4.0 | 4.2 | 4.1 | 4.4 | 4.8 | 4.2 | 4.0 | 4.0 | 3.8 | 4.6 | 4.3 | 4.0 | 4.2 | 4.4 | 4.8 | 4.4 | 4.2 |
| Nitrogen volume (ml/g) | 0.32 | 0.28 | 0.29 | 0.28 | 0.36 | 0.30 | 0.29 | 0.29 | 0.36 | 0.32 | 0.31 | 0.38 | 0.32 | 0.32 | 0.31 | 0.31 | 0.30 |
| Specific volume ($m^3g$) | 0.48 | 0.44 | 0.45 | 0.42 | 0.51 | 0.45 | 0.48 | 0.44 | 0.48 | 0.49 | 0.45 | 0.51 | 0.48 | 0.46 | 0.42 | 0.45 | 0.42 |
| Porosity | 0.67 | 0.64 | 0.64 | 0.67 | 0.71 | 0.67 | 0.60 | 0.66 | 0.75 | 0.65 | 0.69 | 0.74 | 0.67 | 0.70 | 0.74 | 0.69 | 0.71 |

In the examples cited above, the distances between layers in the crystals were invariably in the range of 3.7 to 6.3 nm, mostly not more than 4.0 nm, and the average pore diameters were in the range of 3.8 to 7.2 nm, mostly not less than 4 nm.

What is claimed is:

1. A method for the production of a finely porous article, characterized by adding an ion-exchange resin to an aqueous sodium silicate solution thereby obtaining a colloidal liquid phase containing silica particles, mix- 30 ml per g of said mineral.

9. The method according to claim 6, wherein the amount of said silica particles in said liquid phase is in the range of 0.001 to 50% by weight, based on the amount of said smectite type mineral.

10. The method according to claim 6, wherein said mixture is obtained by adding at least one member selected from the group consisting of organic compounds selected from the consisting of primary amines, secondary amines, tertiary amines and quaternary amines of lower aliphatic hydrocarbons and at least one metal compound selected from the group consisting of sodium aluminate, oxyzirconium chloride, titanium chloride, cobalt chloride and aluminum chloride in an amount in the range of 0.0001 to 10% by weight, based on silica particles, to said colloidal liquid phase and said smectite type mineral.

11. A method for the production of a finely porous smectite article whose pores have an average size of at least 3.8 nm, consisting essentially of:
preparing an aqueous colloidal silica solution in which the silica particles have decreased surface charges by polymerizing silicic acid and removing the salt from the colloidal silicon particles obtained by treating the colloidal solution with a strongly acidic ion exchange resin thereby providing a resultant colloidal solution having a pH within the range of 1-7 with the colloidal silica particles having a particle size of 4-50nm:
mixing said colloidal aqueous phase with smectite type mineral; and then
drying the resultant mixture.

12. A method for the production of a finely porous smectite article whose pores have an average size of at least 3.8nm, consisting essentially of:
preparing an aqueous colloidal $SiO_2$ in which the silica particles have decreased surface charge by treating a silica colloid stabilized by an alkali with a strongly acidic ion-exchange resin which removes salt from the colloid and adjusts the pH value to within the range of 1-7;
mixing said colloidal aqueous phase with smectite type mineral; and then
drying the resultant mixture.

13. A method for the production of the finely porous smectite article whose pores have an average size of at least 3.8 nm, consisting essentially of:
preparing colloidal silica solution in which the silica particles have decreased surface charge by treating a colloidal silica stabilized by an acid with a strongly basic ion exchange resin which removes salts from the colloid and adjusts the pH of the colloidal silica solution to within the range of 7-9;
mixing said colloidal aqueous phase with smectite type mineral; and then
drying the resultant mixture.

14. The method of claim 12, which further comprises treating said acid ion-exchange treated colloidal solution with a weakly basic ion exchange resin which adjusts the pH of the colloidal solution to within the range of 4-7.

15. The method of claim 13, which further comprises treating said basic ion exchange resin treated colloidal solution with a weakly acidic ion exchange resin which adjusts the pH of the colloidal solution to within the range of 4-7.

16. A finely porous smectite article whose pores have an average of at least 3.8nm prepared by the process of claim 11.

17. A finely porous smectite article whose pores have an average of at least 3.8nm prepared by the process of claim 12.

18. A finely porous smectite article whose pores have an average of at least 3.8nm prepared by the process of claim 13.

* * * * *